United States Patent
Stephenson et al.

(10) Patent No.: US 8,453,129 B2
(45) Date of Patent: May 28, 2013

(54) USING HARDWARE INTERRUPTS TO DRIVE DYNAMIC BINARY CODE RECOMPILATION

(75) Inventors: Mark W. Stephenson, Austin, TX (US); Ram Rangan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1184 days.

(21) Appl. No.: 12/108,556

(22) Filed: Apr. 24, 2008

(65) Prior Publication Data

US 2009/0271772 A1    Oct. 29, 2009

(51) Int. Cl.
*G06F 9/45* (2006.01)

(52) U.S. Cl.
USPC ............ 717/148; 717/131; 717/145; 717/154

(58) Field of Classification Search
USPC .......................................................... 717/145
See application file for complete search history.

(56) References Cited

U.S. PATENT DOCUMENTS

| | | | | |
|---|---|---|---|---|
| 6,078,744 | A * | 6/2000 | Wolczko et al. | 717/153 |
| 6,427,234 | B1 * | 7/2002 | Chambers et al. | 717/140 |
| 6,622,300 | B1 * | 9/2003 | Krishnaswamy et al. | 717/130 |
| 6,971,091 | B1 * | 11/2005 | Arnold et al. | 717/145 |
| 7,146,607 | B2 * | 12/2006 | Nair et al. | 717/151 |
| 7,318,222 | B2 * | 1/2008 | Civlin | 717/151 |
| 2002/0108107 | A1 * | 8/2002 | Darnell et al. | 717/153 |
| 2002/0147969 | A1 * | 10/2002 | Lethin et al. | 717/138 |
| 2004/0019886 | A1 * | 1/2004 | Berent et al. | 717/158 |
| 2004/0044880 | A1 * | 3/2004 | Altman et al. | 712/209 |
| 2004/0168005 | A1 * | 8/2004 | Civlin | 710/260 |
| 2005/0028148 | A1 * | 2/2005 | Civlin | 717/145 |
| 2005/0050530 | A1 * | 3/2005 | Civlin | 717/153 |
| 2005/0149915 | A1 * | 7/2005 | Wu et al. | 717/137 |
| 2009/0037892 | A1 * | 2/2009 | Luedde | 717/153 |

OTHER PUBLICATIONS

V. Bala, E. Duesterwald, and S. Banerjia. Dynamo: A transparent dynamic optimization system. In Proceedings of PLDI 2000, pp. 1-12, Vancouver, Canada, Jun. 2000.*

Vasanth Bala, Evelyn Duesterwald, and Sanjeev Banerjia. 2000. Dynamo: a transparent dynamic optimization system. In Proceedings of the ACM SIGPLAN 2000 conference on Programming language design and implementation (PLDI '00). ACM, New York, NY, USA, 1-12. DOI=10.1145/349299.349303 http://doi.acm.org/10.1145/349299.349303.*

* cited by examiner

*Primary Examiner* — Wei Zhen
*Assistant Examiner* — Matthew Brophy
(74) *Attorney, Agent, or Firm* — Yudell Isidore Ng Russell PLLC

(57) ABSTRACT

A method, computer system, and computer program product for using one or more hardware interrupts to drive dynamic binary code recompilation. The execution of a plurality of instructions is monitored to detect a problematic instruction. In response to detecting the problematic instruction, a hardware interrupt is thrown to a dynamic interrupt handler. A determination is made whether a threshold for dynamic binary code recompilation is satisfied. If the threshold for dynamic code recompilation is satisfied, the dynamic interrupt handler optimizes at least one of the plurality of instructions.

26 Claims, 7 Drawing Sheets

FIG. 1 – Prior Art

Original Program Code

Line (1) mr    3, 4
(2) cmpw  7, 4, 5
(3) itag  7
(4) bltr
(5) mr    3, 5
(6) blr

FIG. 5A

Optimized Program Code

Line (1)      mr    3, 4
(2)      pltw p7, 4, 5
(3) (p7) mr    3, 5
(4)      blr

FIG. 5B

USING HARDWARE INTERRUPTS TO DRIVE DYNAMIC BINARY CODE RECOMPILATION

BACKGROUND OF THE INVENTION

The present disclosure relates to the field of computers, and specifically to the use of hardware interrupts to drive dynamic binary code recompilation.

Dynamic binary code recompilation or dynamic recompilation is a feature of some emulators and virtual machines in which a Data Processing System (DPS) may recompile parts of a computer application during execution. For instance, Java Virtual Machines (JVMs) (JAVA and JVM are trademarks of Sun Microsystems, Inc.) use dynamic recompilation to significantly improve the performance of Java applications. By compiling during execution, the DPS can (i) tailor the generated code to reflect the computer application's run-time environment and (ii) produce more efficient code by exploiting information that is unavailable to a traditional static compiler.

Dynamic recompilation systems typically instrument (i.e., insert instrumentation code) to monitor the application that is currently executing. For example, FIG. 1 illustrates an exemplary instrumentation system 100 which applies a typical instrumentation approach. In the exemplary case shown in FIG. 1, the instrumentation system is designed to measure Basic Block (BB) frequencies. A BB is the largest unit/block of code before a branch in execution. Original method 102 includes basic blocks "BBentry", "BB0", "BB1", and "BB2".

Utilizing a statistical sampling approach, an optimizer (not shown) generates cloned program method 102 of original program method 104 that is being optimized, and instruments each cloned BB (e.g., "BB0'", "BB1'", "BB2'") by inserting profiling counters 106. Profiling counters 106 are in the form of instrumentation code that keeps track of BB frequencies. When a particular BB is executed, the profiling counter 106 that is associated with the particular BB is incremented. The optimizer inserts a branch instruction/code in the original program method 104. The branch instruction causes the program execution to jump (represented by arrow 108) under certain instances of execution to cloned program method 102. Since the jump in execution occurs occasionally (i.e., the original program method is usually executed), the performance penalty associated with the instrumentation code is mitigated. Moreover, such a typical instrumentation approach is implemented for coarse measurements such as determining block frequencies, which can contain a considerable number of lines of code which are counted as a basic block.

In contrast to the aforementioned profiling counters, which reside in the software, other types of counters, known as Hardware Performance Monitors (HPMs) reside in the hardware. An HPM provides comprehensive reports of events that facilitate improved performance on DPSs. In addition to the usual timing information, an HPM is able to gather hardware performance metrics, such as the number of branch mispredictions, the number of misses on all cache levels, the number of floating point instructions executed, and the number of instruction loads that cause Translation Lookaside Buffer (TLB) misses, which help the algorithm designer or programmer identify and eliminate performance bottlenecks. Although it is possible to employ hardware performance monitors to drive dynamic recompilation, one drawback of today's hardware performance monitors is their lack of fine-grained measurement support. Such fine-grained support is needed to re-optimize the computer program at the instruction-level granularity.

For example, instead of capturing information about a single, individual instruction, current HPMs merely summarize information, such as the number of cache misses in a code region. One approach is to shrink the code region of cache misses to the granularity of a single instruction such that the system could gather instruction-level miss information. However, such an approach would be expensive given existing interfaces between the processor and the HPMs. Moreover, such an approach presents difficulties for an out-of-order execution processor, where for example, several data storage operations can be in flight at any given time. As a result, any one of the in-flight data storage operations/instructions becomes very difficult to be singled out as an offending instruction.

Another existing approach employs a "pull" approach to how data is communicated to the dynamic optimization system. Under a pull approach, the dynamic optimization system allocates a thread for polling. The execution threads communicate with the polling thread via data storage, or in some cases via the hardware performance counter registers, as described above. The polling thread then determines when recompilation might be beneficial.

Typically, interrupts are handled by an operating system (OS), which can incur a significant performance penalty. If additional hardware support were included to ensure that hardware interrupts were thrown to drive code recompilation/re-optimization for frequently executed and problematic instructions, then the overhead of handling interrupts would not be of paramount concern. However, in the absence of such additional hardware support, a more efficient mechanism is required.

SUMMARY OF THE ILLUSTRATIVE EMBODIMENTS

A method, system, and computer-readable storage medium for implementing hardware interrupts to drive dynamic code recompilation are disclosed. The method includes a "push" approach to recompilation. According to a "push" approach, the hardware immediately notifies a dynamic interrupt handler when the hardware has detected a problematic instruction. Examples of problematic instructions include, but are not limited to branch instructions that are frequently mispredicted or load instructions that frequently cause cache misses. The interrupt handler determines whether dynamic re-optimization is necessary.

The execution of a plurality of instructions is monitored to detect a problematic instruction. In response to detecting the problematic instruction of the plurality of instructions, a hardware interrupt is thrown to the dynamic interrupt handler. The dynamic interrupt handler handles the hardware interrupt and determines whether a threshold for dynamic binary code recompilation is satisfied. If the threshold for dynamic code recompilation is satisfied, one or more of the plurality of instructions is dynamically optimized.

The above as well as additional objectives, features, and advantages of the present invention will become apparent in the following detailed written description.

BRIEF DESCRIPTION OF THE SEVERAL VIEWS OF THE DRAWINGS

Aspects of the invention itself will best be understood by reference to the following detailed description of an illustrative embodiment when read in conjunction with the accompanying drawings, where:

FIGS. 5A and 5B illustrate, respectively, un-optimized and optimized examples of an assembly code fragment that is useful for understanding the invention;

DETAILED DESCRIPTION OF THE INVENTION

Figure 1:
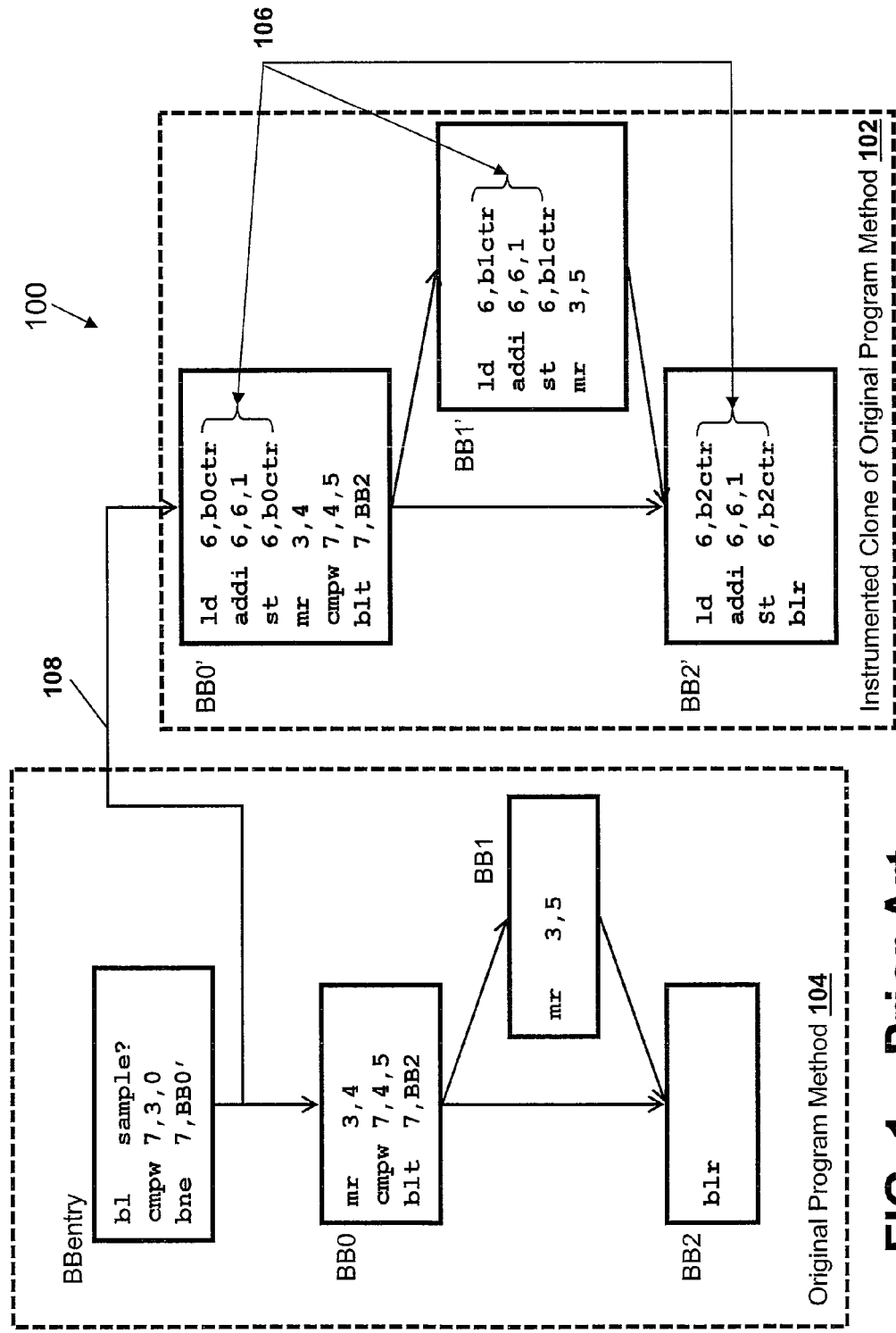
FIG. 1 is a block diagram showing a typical instrumentation approach, which is useful for understanding the invention.
Figure 2:
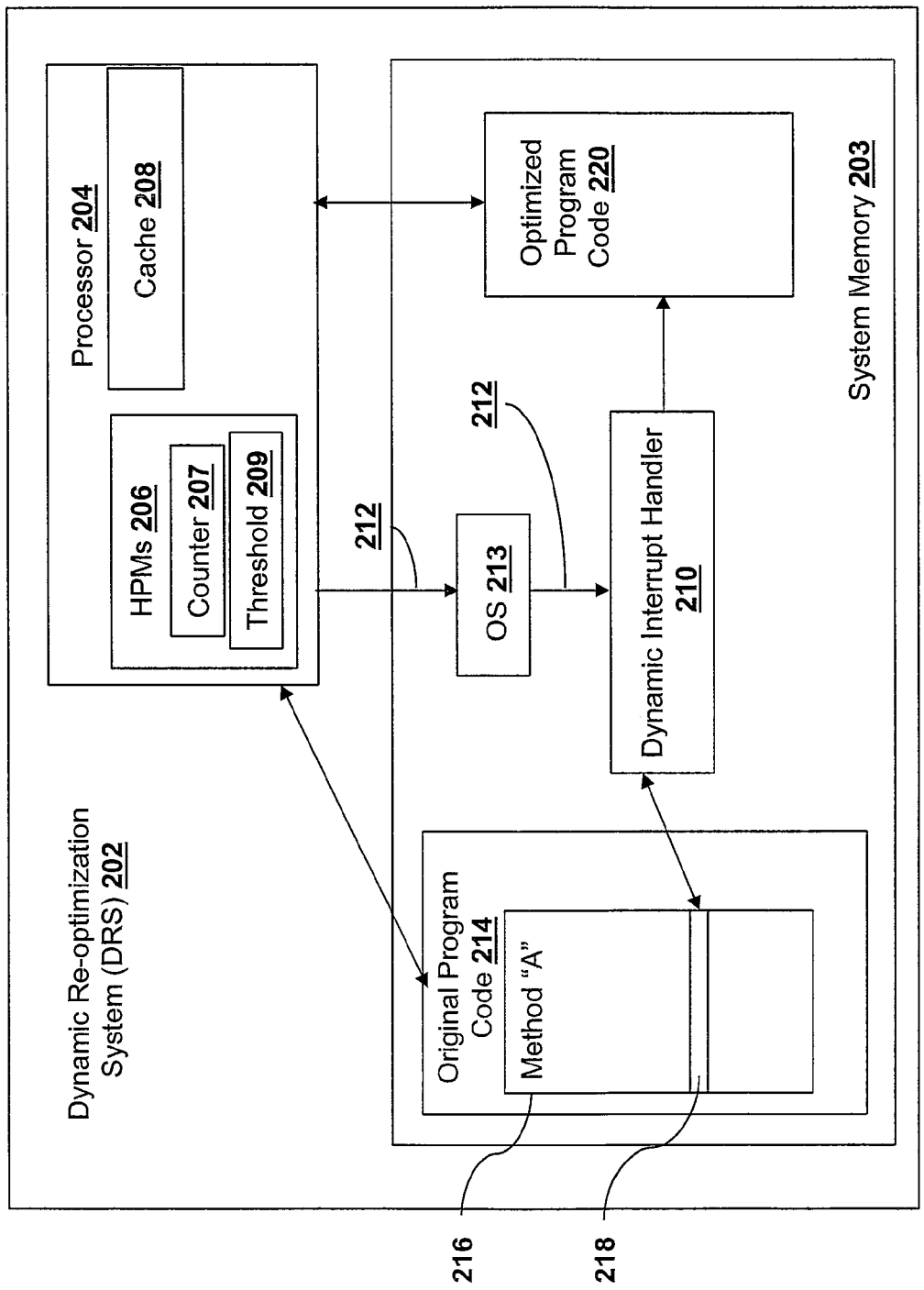
FIG. 2 is a schematic block diagram showing an exemplary Dynamic Re-optimization System (DRS), in accordance with one embodiment of the invention.

With reference now to FIG. 2, in schematic block diagram 200 an exemplary Dynamic Re-optimization System (DRS) 202 is shown, in accordance with one embodiment of the invention. Dynamic Re-optimization System (DRS) 202 includes both hardware components and software components that are stored in a computer-executable storage medium. The hardware component includes processor 204, which in turn includes cache 208 and Hardware Performance Monitor(s) (HPMs) 206. The software components of DRS 202 stored within computer-readable system memory 203 include a dynamic interrupt handler 210 that is responsive to hardware interrupt 212. Hardware interrupt 212 is thrown by processor 204 to dynamic interrupt handler 210 during the execution of original program code 214 having method 216 (e.g., Method "A") containing problematic instruction 218. Dynamic interrupt handler 210 facilitates the creation of optimized program code 220 in response to problematic instruction 218. Additional details regarding the functionality of DRS 202 are described in more detail below.

According to the exemplary embodiment of FIG. 2, original program code 214 is fetched by processor 204 and stored in cache 208. During the execution of original program code 204, processor 204 determines with assistance of HPMs 206 that Method "A" contains problematic instruction 218. As used herein, a "problematic instruction" is an instruction that results in hardware or software errors or inefficiencies when attempted to be executed by a processor. Such types of instructions have the potential for further code optimization. In the area of branch predictability, for example, a problematic instruction can refer to a branch instruction that is processed with significant frequency (or "hot" frequency), but is characterized by poor branch predictability. Once processor 204 has identified problematic instruction 206, processor 204 throws hardware interrupt 212, which invokes via operating system (OS) 213 the software component of DRS 202 (i.e., dynamic interrupt handler 210).

As is known to those skilled in the art, HPMs 206 are types of special purpose registers that enable hardware performance to be monitored. According to one embodiment, HPMs 206 include two types of registers: at least one counter 207 and an associated threshold register 209. The value of counter 207 is continually updated by processor 204. Threshold register 209 has a constant value that can be changed through the use of appropriate software. To interrupt a program using HPMs 206, threshold register 209 is adjusted to a desired threshold value relative to the current value of the associated counter 207. When the current value of counter 207 reaches the current threshold value of threshold register 209, HPM 206 signals hardware interrupt 212, which interrupts the execution of original program code 214 (e.g., Method "A") and passes control to dynamic interrupt handler 210. It should be noted, however, that more sophisticated threshold heuristics are possible (i.e., can be a function of any number of variables, including counter 207). Additional details regarding the functionality of dynamic interrupt handler 210 are set forth below.

Figure 3:
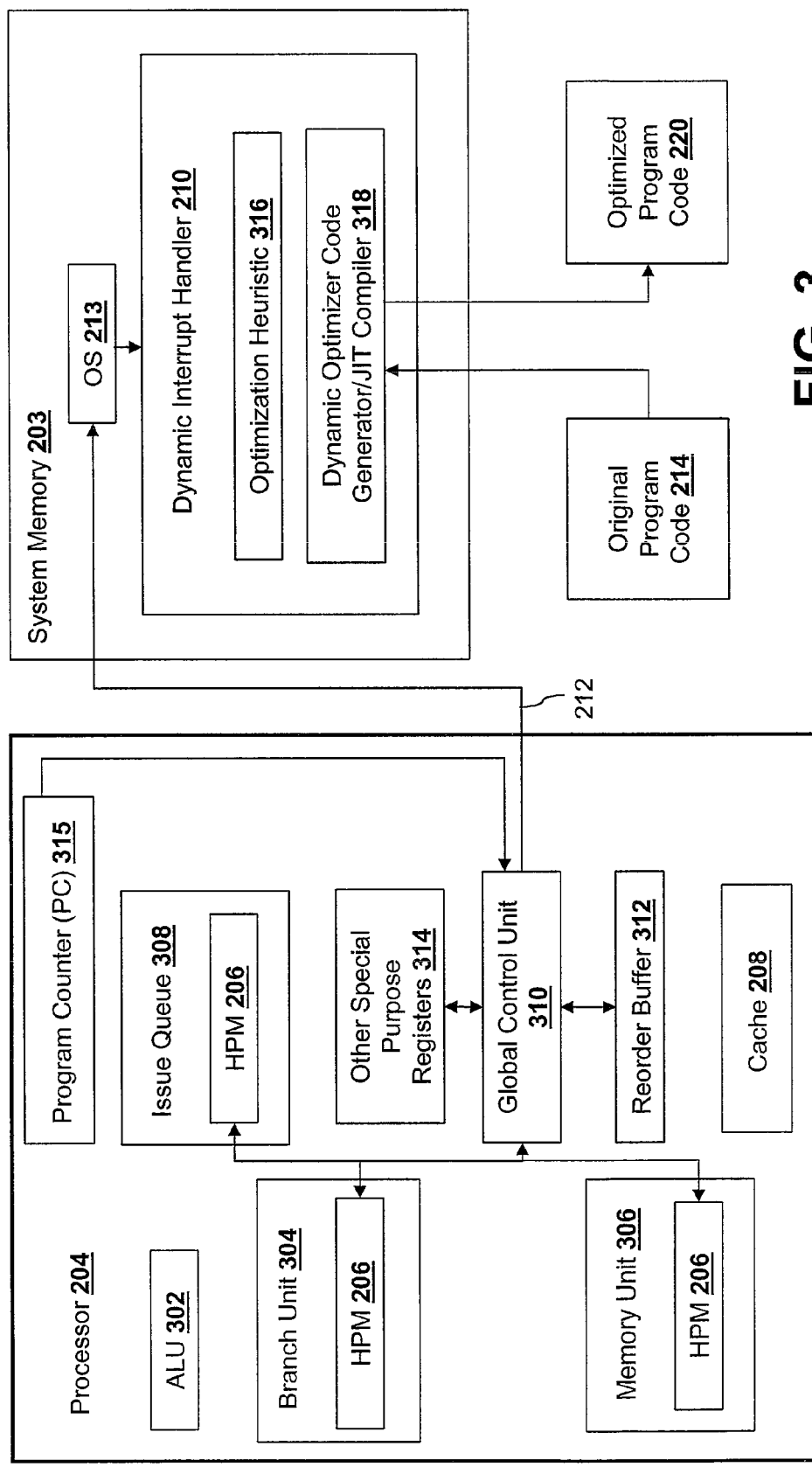
FIG. 3 is a high-level schematic block diagram showing, in greater detail, the processor of exemplary DRS shown in FIG. 2.

FIG. 3 is a simplified schematic diagram 300 that shows additional details regarding exemplary processor 204 (FIG. 2). As shown in FIG. 3, processor 204 includes arithmetic logic unit (ALU) 302, cache 208 (FIG. 2), branch unit 304, memory unit 306, issue queue 308, global control unit 310, reorder buffer 312, additional special purpose registers 314, and program counter (PC) 315. Each of branch unit 304, memory unit 306, and issue queue 308 contains or is coupled to an HPM 206 (FIG. 2) that tracks and monitors certain events relating to the execution of code. HPMs 206 may be distributed across processor 204 so that each counter 207 (FIG. 2) can collect different information.

Those skilled in the art will appreciate that the specific hardware performance monitors used may be varied to suit the needs of particular situations. For instance, the HPM in branch unit 304 is responsible for recording branch behavior, for example, signaling that a hot, unpredictable branch instruction has been detected. The HPM in memory unit 306 is responsible for signaling when the execution of a load instruction has been continually delinquent. Moreover, the HPM in issue queue 308 keeps track of instruction stalls, and signals when a hot instruction is found to continually stall in issue queue 308. Global control unit 310 communicates with each of the HPMs 206 and generates hardware interrupt 212 (FIG. 2) when signaled by the various monitored units (i.e., HPMs 206). Reorder buffer 312 is utilized in conjunction with global control unit 310 to ensure that program instructions that are executed out-of-order are actually retired in order. Moreover, reorder buffer 312 facilitates the use of hardware interrupts and rollback for control of target address mispredictions, such as in the case of a branch or jump instruction. Program counter (PC) 315 stores the address that references the data storage location of a currently executed instruction. It should be appreciated that any suitable processor hardware configuration can be used and, therefore, the processor may include more or less circuitry than shown in FIGS. 2-3.

Within system memory 203, dynamic interrupt handler 210 includes optimization heuristic 316 and dynamic optimizer code generator 318. Dynamic interrupt handler 210 receives hardware interrupt 212 via OS 213. Optimization heuristic 316 facilitates a determination of whether to re-optimize original program code 214 (FIG. 2). The actual re-optimization of original program code 214 into optimized program code 220 (FIG. 2) is performed by dynamic optimizer code generator 318.

Figure 4:
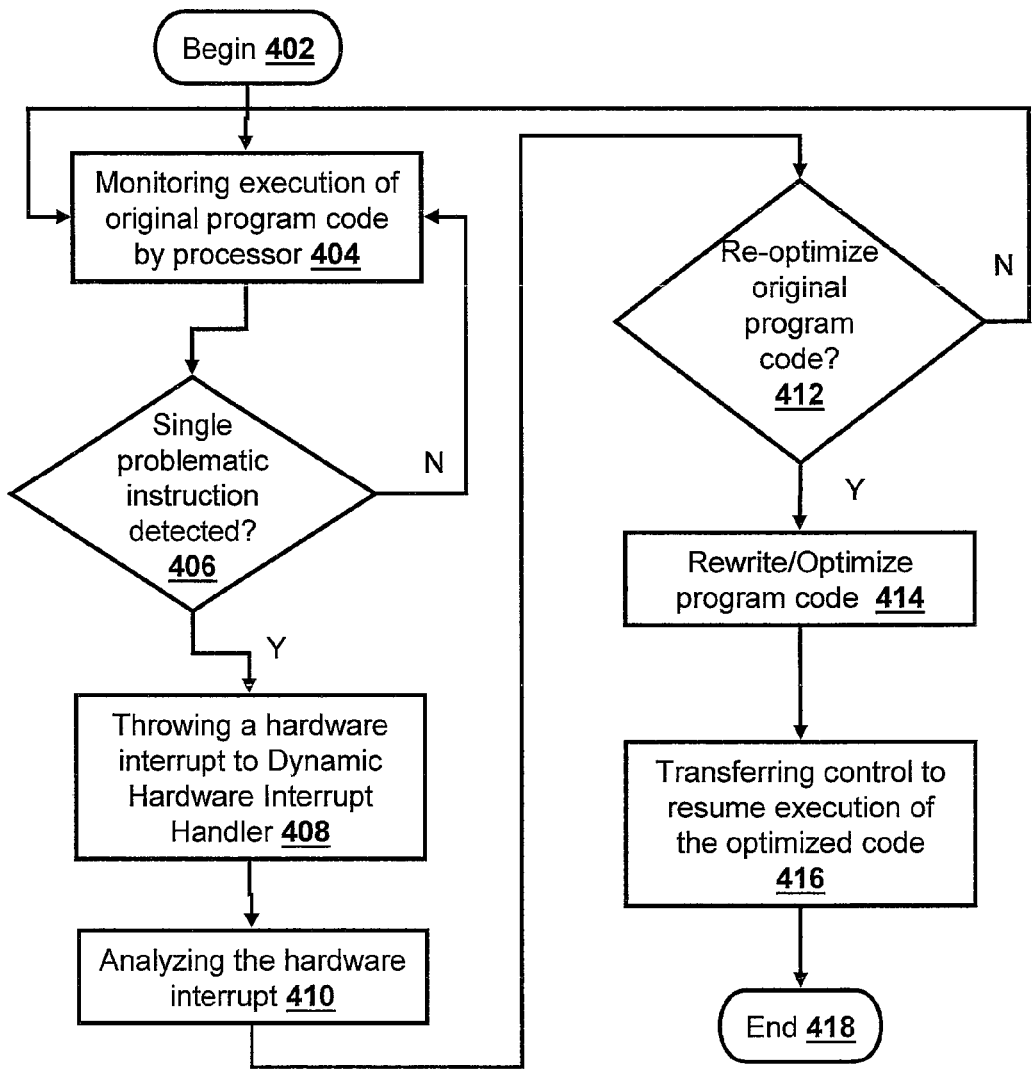
FIG. 4 is a high-level flow diagram of exemplary method steps taken to implement dynamic recompilation using hardware interrupts when executed in conjunction with the Data Processing System (DPS) of FIG. 7, including DRS of FIG. 2 and processor of FIG. 3.

FIG. 4 is a flow chart, which illustrates a method for employing hardware interrupts to drive dynamic binary code recompilation (or dynamic re-optimization). The illustrated method begins at block 402 and proceeds to block 404, which illustrates processor 204 (FIG. 2) monitoring execution of original program code 214 (FIG. 2) by processor 204. During the execution of original program code 214, processor 204 determines whether at least one individual problematic instruction 218 (FIG. 2) is detected, as depicted in decision block 406. If an individual problematic instruction 218 has yet to be detected, the method returns to block 404. However, if an individual instruction 218 is detected, the method proceeds to block 408, where processor 204 throws a hardware interrupt 212 (FIG. 2) to dynamic interrupt handler 210 (FIG. 2) via OS 213 (FIG. 2). Dynamic interrupt handler 210 analyzes hardware interrupt 212, as depicted in block 410. After hardware interrupt 212 has been analyzed, optimization heuristic 316 (FIG. 3) determines (decision block 412) whether original program code 214 should be re-optimized. In this regard, optimization heuristic 316 determines whether a threshold for dynamic binary code recompilation is satisfied. If optimization heuristic 316 determines that original program code 214 does not require dynamic re-optimization, the method returns to monitoring the execution of original program code 214. Otherwise, the method continues to block 414, which depicts dynamic optimizer code generator (or Just-In-Time (JIT) compiler) 318 within dynamic interrupt handler 210 re-optimizing original program code 214. After the re-optimization of original program code 214 has been completed, dynamic interrupt handler 210 transfers control (block 416) back to processor 204 for resumption of execution of newly optimized program code 220 (FIG. 2). However, according to another embodiment, there are circumstances when dynamic interrupt handler 210 cannot transfer control back to processor 204 for immediate execution of newly optimized program code 220. In such circumstances, dynamic interrupt handler 210 transfers control back to processor 204 for execution of original program code 214. Moreover, the system will re-configure a dispatch table such that future invocations of the routine to which original program code 214 is associated, will instead invoke newly optimized program code 220. The method ends at termination block 418.

Branch predictability is one problem that the push approach addresses. Under the "push" approach described in the present invention, processor 204 (FIGS. 2 and 3) throws hardware interrupt (FIG. 2) whenever processor 204 identifies a problematic instruction 218, such as an unpredictable branch instruction. Processor 204 keeps track of a branch instruction's predictability by maintaining confidence estimations in a branch predictor of branch unit 304 (FIG. 3). According to one exemplary embodiment, dynamic interrupt handler 210 utilizes a hash table to log/record: (i) information about specific branch instructions (or branch-specific information) that trigger hardware interrupt 212, as well as (ii) information pertaining to the routines (or routine-specific information) in which the branch instructions reside. As an example, an assumption is made that the routine in which one of the branch instructions resides is frequently executed and/or contains several unpredictable branches. Such routines that are frequently executed and/or that contain several unpredictable branches are commonly referred to as "hot" routines. Whenever an unpredictable branch instruction is mispredicted, global control unit 310 (FIG. 3) throws hardware interrupt 212 to dynamic interrupt handler 210. By logging such branch-specific and routine-specific information, the dynamic interrupt handler has enough information about the "hot" routine to determine whether the code (e.g., "hot" routine) requires rewriting/re-optimization.

It should be noted that at least some of the embodiments discussed herein employ instruction set annotations that indicate to the hardware which instructions can trigger a dynamic optimization interrupt. While it should be appreciated that the invention is not limited in this regard, such instruction set annotations allow the dynamic re-optimization system to (i) stop the measurement of unimportant or already-optimized regions of code and (ii) avoid the launch of a subsequent hardware interrupt. Thus, the instruction set annotations allow the dynamic re-optimization system to reach a steady state.

To illustrate the above features concerning the various embodiments of the invention, FIGS. 5A and 5B illustrate, respectively, un-optimized and optimized examples of an assembly code fragment that is suitable for a Power PC® (a registered trademark of IBM Corporation) instruction set architecture (ISA). For exemplary purposes, the un-optimized assembly code fragment of FIG. 5A is first considered. In this regard, several assumptions are made. First, the example code in FIG. 5A assumes that the branch instruction on line (4) is unpredictable. Second, the tagging instruction (not necessarily an ISA instruction) at line (3) labeled "itag" is assumed to indicate that the following instruction (i.e., the branch instruction at line (4)) can throw an interrupt. The "itag" instruction is an informational instruction. Without the "itag" instruction, the processor does not throw an interrupt, even if the branch instruction at line (4) is assumed to be unpredictable. Once processor 204 (FIGS. 2 and 3) has determined the branch instruction at line (4) to be unpredictable, on the next misprediction of the branch instruction, processor 204 will throw a hardware interrupt 212 (FIGS. 2 and 3). According to one embodiment, processor 204 then passes the program counter (PC) of the problematic instruction to dynamic interrupt handler 210. In this way, the routines that handle hardware interrupt 212 know the exact location of problematic instruction 218 for efficient re-optimization.

According to one embodiment, program code re-optimization includes dynamic if-conversion of mispredicted branch instructions (i.e., in the case of branch misprediction). As used herein, if-conversion is a compiler optimization that eliminates branches in a region of code. For simplicity, the example shown in FIG. 5A considers simple regions called hammocks. A hammock refers to an innermost if-then or if-then-else region. For example, the region of un-optimized instructions in FIG. 5A represents an if-then statement. Based on a comparison on line (2), the branch instruction on line (4) will either: (i) fall through to the instruction on line (5), or (ii) the branch instruction will return to the caller via the return blr instruction at line (6). Thus, in the example shown in FIG. 5A, the instruction on line (5) is conditionally dependent of the branch instruction on line (4), since the branch instruction on line (4) may or may not execute.

FIG. 5B shows the corresponding re-optimized, if-converted (or predicated) code, according to one embodiment of the invention. According to FIG. 5B, the instruction on line (2) sets a predicate register "p7" based on the following exemplary comparison: if register "4" is less than register "5", then predicate register "p7" is set to true, otherwise, predicate register "p7" is set to false. Moreover, the instruction at line (3) is guarded by the predicate "p7". As such, the processor will only commit the results (i.e., change the visible state of the processor or visible processor state) if predicate "p7" is set to true. Moreover, if-conversion removes control dependencies. Thus in FIG. 5B, the instruction at line (3) still executes, but the instruction at line (3) will only modify the visible processor state if the guarding predicate "p7" is set to true.

Figures 6A, 6B:
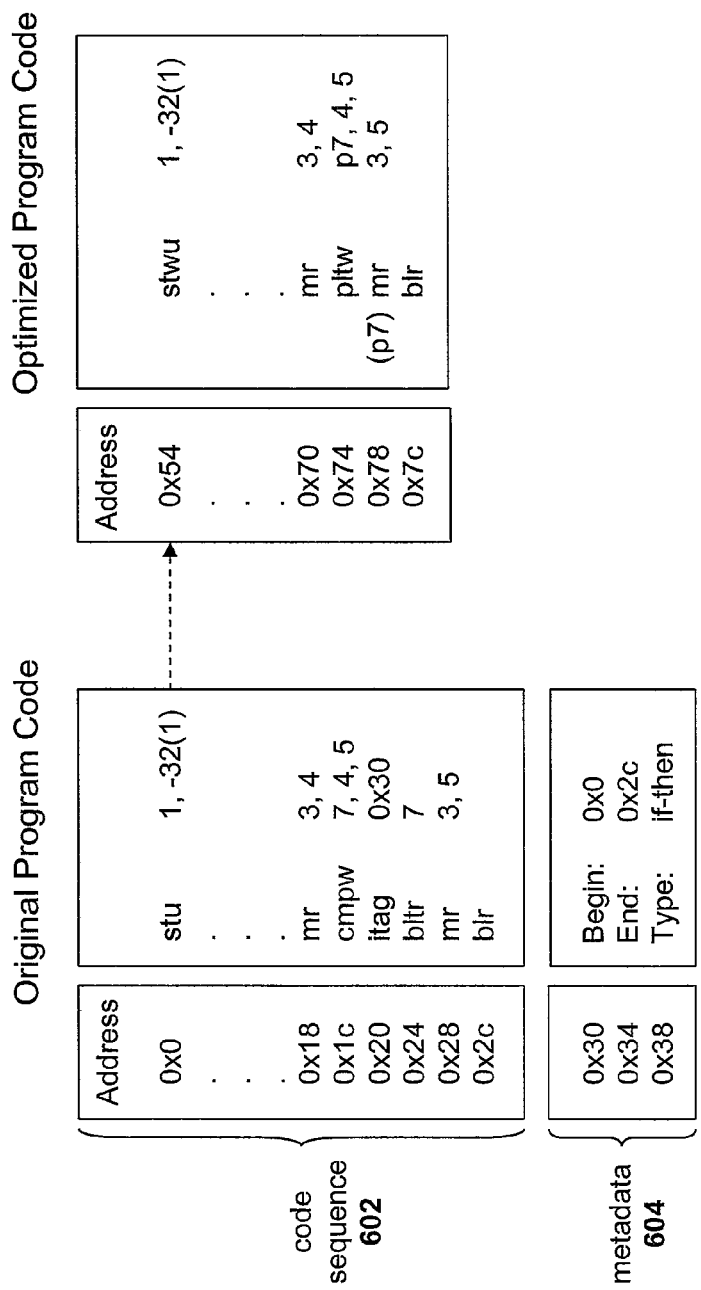
FIGS. 6A and 6B illustrate, respectively, un-optimized and optimized examples of program code that utilizes a hardware interrupt-driven approach to branch prediction code optimization, in accordance with one embodiment of the invention.

With reference now to FIGS. 6A and 6B, an exemplary embodiment showing the hardware interrupt-driven approach to dynamic recompilation of FIG. 4 as applied to branch predictability issues is described. Under a hardware interrupt-driven approach, a processor throws a hardware interrupt when the processor mispredicts an unpredictable branch instruction. As a result, the task of identifying problematic instructions has been moved to the hardware. This move simplifies the dynamic optimizer (i.e., dynamic interrupt handler) since the compiler no longer has to insert explicit instrumentation code and a polling thread is no longer required to determine whether recompilation of the executed code might be beneficial.

According to one embodiment, the static compiler links a dynamic optimizer with original program code 214 that handles such "unpredictable branch" interrupts. FIG. 6A shows an exemplary block of original program code, which is helpful to illustrate how a dynamic optimizer rewrites a "hot" routine. For simplicity of explanation, the original program code sequence 602 is assumed to begin at address 0×0. When processor throws the hardware interrupt for the "bltr" instruction at address 0×24, the processor passes two arguments to the interrupt handler. The first argument that is passed is a program counter (PC) of the branch instruction (0×24). The second argument that is passed is the address of the associated metadata values 604 (0×30) specified by the preceding "itag" instruction. Using metadata values 604, the interrupt handler can discern the type of branch statement (e.g., if-then statement or if-then-else statement) and the boundaries of the routine.

In the example above, a static compiler is responsible for generating the original metadata values and for ensuring that only branch instructions that can be safely if-converted are tagged. Although much information could generally be reconstructed at runtime, the metadata makes the handling of interrupts much more efficient. Furthermore, some control flow information cannot be inferred at runtime. Thus, in the absence of metadata values 604, dynamic interrupt handler would be required to behave in a conservative manner. By "conservative", the following explanation is provided. Since the static compiler has a very complete view of the structure of a program, the static compiler can easily determine for many code optimizations—including if-conversion—when it is safe to perform the code optimization. The runtime system (i.e., particularly the JIT compiler) has a much better idea of the runtime tendencies of a program, but cannot always accurately reconstruct the high-level structure of the program. Thus, a "conservative manner" in the above context means that the runtime system may not be able to confirm that a particular code optimization is correct. Thus, dynamic interrupt handler 210 will have to assume that it is unsafe to perform the code optimization. For if-conversion, the static compiler can quickly determine when the dynamic interrupt handler can be safely applied (i.e., the dynamic optimizer code generator (or Just-In-Time (JIT) compiler) 318 will generate the correct optimized program code 220). The static compiler can communicate this knowledge to the JIT compiler in the form of metadata. With this methodology, the JIT compiler will not have to reconstruct the program code. The JIT compiler analyzes the metadata to determine whether it is safe to if-convert a particular branch instruction.

FIG. 6B shows the block sequence of code that is re-optimized from original program code (shown in FIG. 6A). The re-optimized code contains the if-converted representation of the if-then statement in the original program code. Moreover, dynamic interrupt handler patches all local control flow to ensure that local control flow stays within the newly generated routine, and does not jump back to the un-optimized version contained in original program code.

In such a dynamic system, there are circumstances in which the system may continually oscillate. For some applications, such continuous oscillation is a desired behavior. However, for other applications, it is desirable for the dynamic re-optimization system to eventually converge to a steady state solution. According to one embodiment of the dynamic re-optimization system described in FIGS. 6A and 6B, a steady state is achieved by omitting tagged (e.g. "itag") instructions in dynamically generated code. Branch instructions that are not annotated with tagged instructions will not invoke dynamic interrupt handler.

Figure 7:
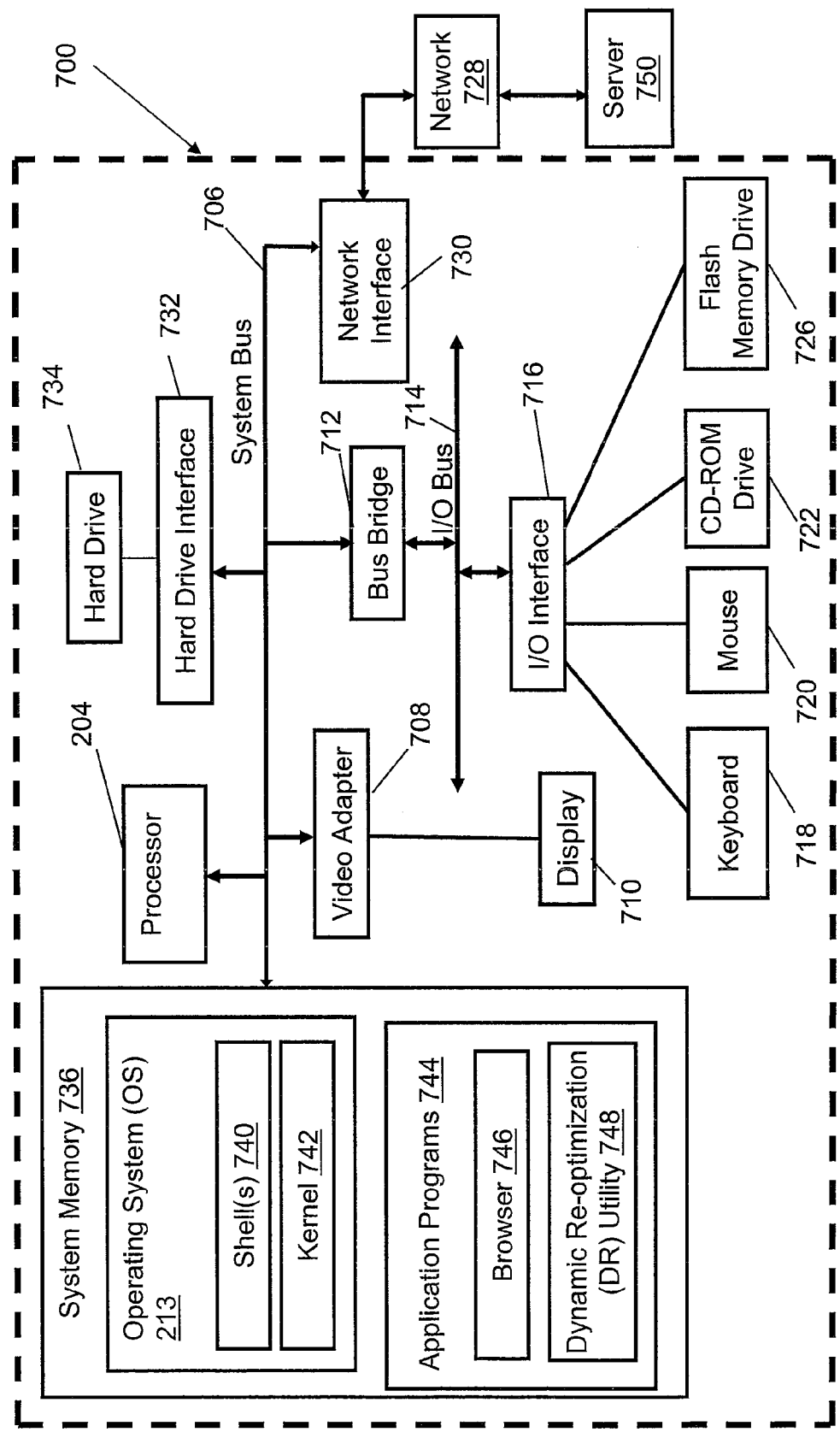
FIG. 7 is a block diagram of an exemplary Data Processing System (DPS) in which the present invention may be implemented.

With reference now to FIG. 7, there is depicted a block diagram of an exemplary Data Processing System (DPS) 700, with which the present invention may be utilized. DPS 700 includes a processor 204 (FIG. 2) that is coupled to a system bus 706. A video adapter 708, which drives/supports a display 710, is also coupled to system bus 706. System bus 706 is coupled via a bus bridge 712 to an Input/Output (I/O) bus 714. An I/O interface 716 is coupled to I/O bus 714. I/O interface 716 affords communication with various I/O devices, including a keyboard 718, a mouse 720, a Compact Disk—Read Only Memory (CD-ROM) drive 722, and a flash memory drive 726. The format of the ports connected to I/O interface 716 may be any known to those skilled in the art of computer architecture, including but not limited to Universal Serial Bus (USB) ports.

DPS 700 is able to communicate with a server 750 via a network 728 using a network interface 730, which is coupled to system bus 706. Network 728 may be an external network such as the Internet, or an internal network such as an Ethernet or a Virtual Private Network (VPN). Server 750 may be architecturally configured in the manner depicted for DPS 700.

A hard drive interface 732 is also coupled to system bus 706. Hard drive interface 732 interfaces with a hard drive 734. In one embodiment, hard drive 734 populates a system memory 203 (FIG. 2), which is also coupled to system bus 706. System memory 203 is defined as a lowest level of volatile data storage in DPS 700. This volatile data storage may include additional higher levels of volatile data storage (not shown), including, but not limited to, cache memory, registers, and buffers. Code that populates system memory 203 includes operating system (OS) 213 (FIG. 2) and application programs 744.

OS 213 includes a shell 740, for providing transparent user access to resources such as application programs 744. Generally, shell 740 (as it is called in UNIX® (UNIX is a registered trademark of The Open Group) is a program that provides an interpreter and an interface between the user and the operating system. Shell 740 provides a system prompt, interprets commands entered by keyboard 718, mouse 720, or other user input media, and sends the interpreted command(s) to the appropriate lower levels of the operating system (e.g., kernel 742) for processing. As depicted, OS 213 also includes kernel 742, which includes lower levels of functionality for OS 213. Kernel 742 provides essential services required by other parts of OS 213 and application programs 744. The services provided by kernel 742 include data storage management, process and task management, disk management, and I/O device management.

Application programs 744 include a browser 746. Browser 746 includes program modules and instructions enabling a World Wide Web (WWW) client (i.e., DPS 700) to send and receive network messages to the Internet. DPS 700 may utilize HyperText Transfer Protocol (HTTP) messaging to enable communication with server 750. Application programs 744 in system memory 203 also include a Dynamic Re-optimization (DR) utility 748. DR utility 748 performs the functions illustrated below in FIG. 4, and may include all logic, helper functions, databases and other resources depicted below in FIGS. 2 and 3.

The hardware elements depicted in DPS 700 are not intended to be exhaustive, but rather represent and/or highlight certain components that may be utilized to practice the present invention. Variations of the illustrated components and architecture are within the spirit and scope of the present invention.

As will be appreciated by one skilled in the art, the present invention may be embodied as a method, system, or computer program product. Accordingly, the present invention may take the form of an entirely hardware embodiment, software embodiment (including firmware, resident software, microcode, etc.) or an embodiment combining software and hardware aspects that may all generally be referred to herein as a "circuit," "module" or "system." Furthermore, the present invention may take the form of a computer program product on a tangible computer-usable storage medium having computer-usable program code embodied in the storage medium and processable by a computer.

Any suitable tangible computer-readable storage medium may be utilized. The tangible computer-readable storage medium may be, for example, an electronic, magnetic, optical, electromagnetic, or semiconductor system, apparatus, device. More specific examples (a non-exhaustive list) of the tangible computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a tangible computer-readable storage medium may be any medium that can store, the program for use by or in connection with the instruction execution system, apparatus, or device.

Computer program code for carrying out operations of the present invention may be written in an object oriented programming language such as Java® (JAVA is a trademark or registered trademark of Sun Microsystems, Inc. in the United States and other countries), Smalltalk® (SMALLTALK is a trademark or registered trademark of Cincom Systems, Inc.), C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable data storage that can direct a computer or other programmable data processing apparatus to function in a particular manner, such that the instructions stored in the computer-readable data storage produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block or blocks.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method in a data processing system for using a hardware interrupt to drive dynamic binary code recompilation, the method comprising:
   a processor of the data processing system monitoring execution of a plurality of instructions in an original program code to detect a problematic unpredictable branch instruction among said plurality of instructions;
   the processor determining whether the problematic unpredictable branch instruction is tagged for dynamic optimization in the original program code by a compiler;
   responsive to detecting said problematic unpredictable branch instruction, the processor throwing a hardware interrupt to a dynamic interrupt handler only in response to determining the problematic unpredictable branch instruction is tagged for dynamic optimization;
   said dynamic interrupt handler determining whether a threshold for dynamic binary code recompilation is satisfied;
   responsive to determining that said threshold for dynamic binary code recompilation is satisfied, dynamically optimizing said plurality of instructions
   maintaining in a branch instruction address hash table respective information regarding mispredictions of each of multiple branch instructions among the plurality of instructions; and
   wherein said determining whether a threshold for dynamic binary recompilation is satisfied comprises determining whether a threshold for dynamic binary recompilation is satisfied based at least in part on said information regarding mispredictions on said branch instruction address hash table.

2. The method of claim 1, wherein:
   the dynamically optimizing comprises rewriting the plurality of instructions in the original program code as an optimized plurality of instructions in optimized program code; and
   the method further comprises transferring control from said dynamic interrupt handler to said processor to resume execution of said optimized plurality of instructions.

3. The method of claim 1, wherein said throwing a hardware interrupt to a dynamic interrupt handler comprises passing from a program counter (PC) an instruction address of said problematic unpredictable branch instruction to said dynamic interrupt handler.

4. A computer system for dynamic code re-optimization comprising: a processor including:
   at least one execution unit that executes a plurality of instructions in an original program code;
   a hardware performance monitor that monitors to detect a problematic unpredictable branch instruction among the plurality of instructions; wherein the processor determines whether the problematic unpredictable branch instruction is tagged for dynamic optimization in the original program code by a compiler and, only in response to determining the problematic is tagged for dynamic optimization, throws a hardware interrupt in response to detection of the problematic unpredictable branch instruction; a data storage coupled to the processor; and
   a dynamic re-optimization (DR) utility within said data storage and executable on the processor to cause the computer system to perform:
   in response to the hardware interrupt, a dynamic interrupt handler determining whether a threshold for dynamic binary code recompilation is satisfied;
   responsive to determining that said threshold for dynamic binary code recompilation is satisfied, dynamically optimizing said plurality of instructions
   wherein the data storage includes in a branch instruction address hash table respective information regarding mispredictions of each of multiple branch instructions among the plurality of instructions; and
   wherein said dynamic interrupt handler determines whether the threshold for dynamic binary recompilation is satisfied based at least in part on said information regarding mispredictions on said branch instruction address hash table.

5. The computer system of claim 4, wherein:
   the dynamically optimizing comprises rewriting the plurality of instructions in the original program code as an optimized plurality of instructions in optimized program code; and
   said DR utility further causes the computer system to perform transferring control from said dynamic interrupt handler to said processor to resume execution of said optimized plurality of instructions.

6. The computer system of claim 4, wherein the hardware performance monitor includes a counter that records occurrences of events relating to execution of said plurality of instructions and has an associated threshold register specifying a dynamic recompilation threshold for the counter.

7. The computer system of claim 6, wherein said hardware performance monitor signals for a generation of said hardware interrupt in response to a value of said counter satisfying the threshold specified by said associated threshold register.

8. The computer system of claim 4, wherein: the processor includes a program counter;
   the hardware interrupt includes a program counter value indicating an instruction address of said problematic unpredictable branch instruction to said dynamic interrupt handler.

9. A computer program product for dynamic binary code re-optimization, the computer program product comprising:
   a tangible computer-usable storage device, not including a transitory signal, having optimization program code stored therein processable by a computer to cause the computer to:
   monitor execution of a plurality of instructions in an original program code to detect a problematic unpredictable branch instruction among said plurality of instructions;
   determine whether the problematic unpredictable branch instruction is tagged for dynamic optimization in the original program code by a compiler;
   throw a hardware interrupt to a dynamic interrupt handler in response to detection of said problematic unpredictable branch instruction only in response to determining the problematic unpredictable branch instruction is tagged for dynamic optimization;
   determine, by said dynamic interrupt handler, whether a threshold for dynamic binary code recompilation is satisfied; and dynamically optimize said plurality of instructions in response to determining that said threshold for dynamic binary code recompilation is satisfied maintain, in a branch instruction address hash table, respective information regarding mispredictions of each of multiple branch instructions among the plurality of instructions; and wherein said determining whether a threshold for dynamic binary recompilation is satisfied comprises determining whether a threshold for dynamic binary recompilation is satisfied based at least in part on said information regarding mispredictions on said branch instruction address hash table.

10. The computer program product of claim 9, wherein:

the optimization program code causes the computer to dynamically optimize by rewriting the plurality of instructions in the original program code as an optimized plurality of instructions in optimized program code; and the optimization program code further causes the computer to transfer control from said dynamic interrupt handler to said processor to resume execution of said optimized plurality of instructions.

11. The computer program product of claim 9, wherein said optimization program code is configured to pass from a program counter (PC) an instruction address of said problematic unpredictable branch instruction to said dynamic interrupt handler.

12. The method of claim 1, wherein determining whether the problematic instruction is tagged comprises determining whether the problematic instruction is tagged by a separate an informational instruction in the original program code, wherein the informational instruction specifies an address of a storage location of metadata identifying a type of the problematic unpredictable branch instruction and identifying a range of instructions to be dynamically optimized among the plurality of instructions.

13. The method of claim 2, and further comprising:

after the dynamically optimizing, annotating the optimized program code to prevent further dynamic optimization of the plurality of instructions.

14. The method of claim 13, and further comprising:

based on annotation of the optimized program code, refraining from throwing the hardware interrupt to the dynamic interrupt handler in response to detection of the problematic instruction.

15. The method of claim 13, and further comprising:

based on annotation of the optimized program code, refraining from further monitoring of execution of the plurality of instructions to detect the problematic unpredictable branch instruction.

16. The method of claim 1, wherein:

the processor includes an issue queue from which instructions are issued for execution; and the problematic unpredictable branch instruction is an instruction that stalls in the issue queue.

17. The method of claim 1, wherein dynamically optimizing said plurality of instructions includes:

transferring control from the dynamic interrupt handler to the processor for further execution of the original program code; and reconfiguring a dispatch table so that future invocations of the original program code will instead invoke optimized program code including the plurality of instructions as optimized.

18. The computer system of claim 4, wherein:

the processor determines whether the problematic unpredictable branch instruction is tagged by determining whether the problematic unpredictable branch instruction is tagged by an informational instruction in the original program code; and the informational instruction specifies an address of a storage location of metadata identifying a type of the problematic unpredictable branch instruction and identifying a range of instructions to be dynamically optimized among the plurality of instructions.

19. The computer system of claim 5, wherein the DR utility further causes the computer to:

after the dynamically optimizing, annotate the optimized program code to prevent further dynamic optimization of the plurality of instructions.

20. The computer system of claim 19, wherein the processor, based on annotation of the optimized program code, refrains from throwing the hardware interrupt to the dynamic interrupt handler in response to detection of the problematic unpredictable branch instruction.

21. The computer system of claim 19, wherein the processor, based on annotation of the optimized program code, refrains from further monitoring of execution of the plurality of instructions to detect the problematic unpredictable branch instruction.

22. The computer system of claim 4, wherein: the processor includes an issue queue from which instructions are issued for execution;

and the problematic unpredictable branch instruction is an instruction that stalls in the issue queue.

23. The computer system of claim 4, wherein dynamically optimizing said plurality of instructions includes:

transferring control from the dynamic interrupt handler to the processor for further execution of the original program code; and reconfiguring a dispatch table so that future invocations of the original program code will instead invoke optimized program code including the plurality of instructions as optimized.

24. The method of claim 1, wherein dynamically optimizing said plurality of instructions includes removing the problematic unpredictable branch instruction from among said plurality of instructions.

25. The computer system of claim 4, wherein dynamically optimizing said plurality of instructions includes removing the problematic unpredictable branch instruction from among said plurality of instructions.

26. The computer program product of claim 9, wherein the optimization program code causes the computer to dynamically optimize said plurality of instructions by removing the problematic unpredictable branch instruction from among said plurality of instructions.

* * * * *